MULTIPLE STATE LOGIC CIRCUITS

Filed July 22, 1966 4 Sheets-Sheet 1

INVENTORS
ANATOLE TURECKI &
JOHNNY A. VALLEE
BY
Samuel Cohen
Attorney

MULTIPLE STATE LOGIC CIRCUITS

INVENTORS
ANATOLE TURECKI &
BY JOHNNY A. VALLEE'

Attorney

INVENTORS
ANATOLE TURECKI &
BY JOHNNY A. VALLEE
Attorney

MULTIPLE STATE LOGIC CIRCUITS

Filed July 22, 1966 4 Sheets-Sheet 4

INVENTORS
ANATOLE TURECKI &
BY JOHNNY A. VALLEE'
Attorney 3,482,172
MULTIPLE STATE LOGIC CIRCUITS Anatole Turecki, North Palm Beach, and Johnny A. Valleé, Junio Beach, Fla., assignors to RCA Corporation, a corporation of Delaware Filed July 22, 1966, Ser. No. 567,290
Int. Cl. H03k 3/14
U.S. Cl. 328—205 9 Claims

ABSTRACT OF THE DISCLOSURE

First, second and third gate circuits for producing respective outputs A, C and B when in one condition and $\overline{A}$, $\overline{C}$ and $\overline{B}$ when in another condition. At least the first and second gate circuits each include two multiple input gates. There is feedback from each gate circuit to the remaining two gate circuits such that the circuits initially may be placed in a reset state from which they can be switched to at least a second or third state. In a number of embodiments, the feedback is such that when the circuit is in the second state, it cannot be switched to the third state or vice-versa without first being placed in the reset state.

While not restricted to this particular use, the circuits of the application were designed as priority circuits. They are employed in a system which includes two basic processing units and a relatively large number of peripheral devices which are common to these processing units. Either basic processing unit may request access to any one of the peripheral devices at any time. However, each peripheral device is capable of interacting with only one basic processing unit at a time.

The circuits of the present invention permit the first arriving of two "requests for service," directed to a single peripheral device, to obtain control of that peripheral device. These circuits also prevent the second arriving request for service from obtaining access to the same peripheral device.

The circuits of the application include a plurality of logic gates which receive control signals indicative of requests for service. These gates also receive feedback signals derived from the outputs of the gates. The circuits initially may be placed in a reset condition, in which condition they can be switched by one request for service to a second state or by a second request for service to a third state. When switched to one of these two other states, in response to one request for service, the feedback signals produced prevent the circuits from being affected by a second request for service until the circuits are placed in a reset condition by a separate reset command.

The invention is discussed in greater detail below and is shown in the following drawings of which:

FIGURES 1*a*–1*d* are diagrams of the gate conventions employed in the remaining figures;

The blocks making up the figures are circuits which receive electrical signals indicative of binary digits (bits) and which produce outputs indicative of bits. For the sake of brevity in the explanation which follows, rather than speaking of a signal which represents the binary digit 1 or 0, the bit itself is referred to.

Figure 1A:
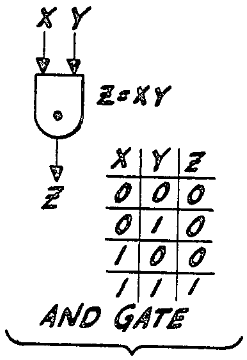
Figure 1B:
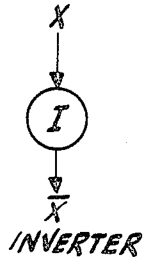
Figure 1C:
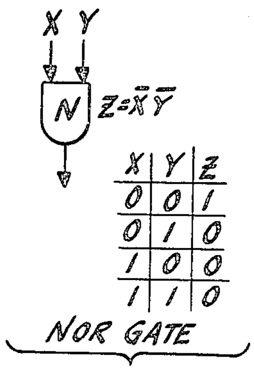
Figure 1D:
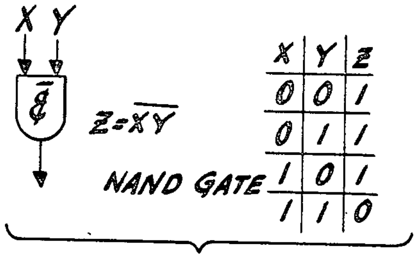
Figure 2:
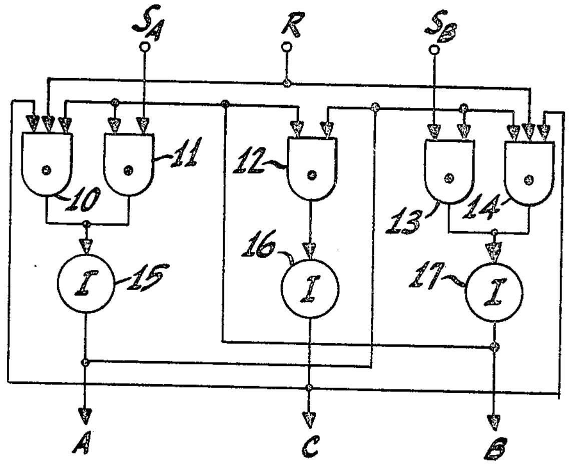
FIGURE 2 is a block circuit diagram of one embodiment of the invention.

The circuit of FIGURE 2 includes five AND gates 10–14 and three inverters 15–17. AND gates 10 and 11 supply their output to inverter 15, AND gate 12 supplies its output to inverter 16, and AND gates 13 and 14 supply their output to inverter 17. The common connection at the output of two gates such as 10 and 11 realizes the Boolean OR function.

The output C of inverter 16 is fed back as an input to AND gates 10 and 14. The output A of inverter 15 is fed back as an input to AND gates 12, 13 and 14. The output B of inverter 17 is fed back as an input to AND gates 10, 11 and 12.

The three control signals applied to the circuit are $S_A$, R and $S_B$.

The operation of the circuit of FIGURE 2 is completely described in the map below titled Table 1. The letters *a*, *c* and *b* represent the assumed present state of the circuit, that is, the values of A, C and B, respectively, at the circuit output terminals, at the very instant new values of $S_A$, R and $S_B$ are applied to the circuit. The assumption is made, for purposes of analysis, that the instantaneous value of *acb* need not be equal to that of ACB because of delays in the feedback loops. Although for the sake of this analysis, the eight permutations of *acb* are listed, only some of them are possible as actual present circuit states, as will be seen shortly.

The three digit binary numbers within the boxes of the map represent the next circuit state, that is, the values A, C and B will assume—the values they will have at the input terminals of the respective AND gates, in response to the inputs $S_A$, R and $S_B$, respectively. The plus signs in the map identify the only stable states of the circuit.

TABLE I

| | $S_AR\ S_B$ | | | | | | | | |
|---|---|---|---|---|---|---|---|---|---|
| | (1) | (2) | (3) | (4) | (5) | (6) | (7) | (8) | |
| ABC | 000 | 001 | 011 | 010 | 110 | 111 | 101 | 100 | |
| (1) 000---- | 111 | 111 | 111 | 111 | 111 | 111 | 111 | 111 | |
| (2) 001---- | 111 | 111 | 111 | 111 | 011 | 011 | 011 | 011 | |
| (3) 011---- | 111 | 111 | 011+ | 011+ | 011+ | 011+ | 011+ | 011+ | Set A |
| (4) 010---- | 111 | 111 | 111 | 111 | 111 | 111 | 111 | 111 | |
| (5) 110---- | 111 | 110+ | 110+ | 110+ | 110+ | 110+ | 110+ | 111 | Set B |
| (6) 111---- | 101 | 100 | 000 | 000 | 000 | 000 | 000 | 001 | |
| (7) 101---- | 101+ | 100 | 100 | 101+ | 001 | 000 | 000 | 001 | Reset |
| (8) 100---- | 111 | 110 | 110 | 111 | 111 | 110 | 110 | 111 | |
| | ACB (next state) | | | | | | | | |

A brief explanation may be in order at this point of how the map is constructed. A more complete explanation may be found in the volume "Switching Circuits for Engineers" by M. P. Marcus, Prentice-Hall, 1962. First, the Boolean equations are formulated which define the circuit operation. These are:

$$A=(\overline{S_Ab+cRb}) \quad (1)$$

$$C=(\overline{ab}) \quad (2)$$

$$B=(\overline{S_Ba+cRa_Q}) \quad (3)$$

Equation 1 states, for example, that A is 0 when both $S_A$ and *b* are 1, or when *c*, R and *b* are all 1. $S_A$ is 1 in columns 5, 6, 7 and 8. *b* is 1 in rows 2, 3, 6 and 7. Accordingly, a 0 is entered as the first digit of the number in each box in the matrix at the intersection of these rows and columns. For example, in column 5, rows 2, 3, 6 and 7, a 0 appears as the first digit. In column 6, rows 2, 3, 6 and 7, a 0 appears as the first digit and so on and so on. In a similar manner, as $R=1$ in column 4, for example, and $c$ and $b$ are both 1 in row 3, a 0 appears as the first digit in the box at the intersection of column 4 and row 3.

After all of the zeros indicated by Equation 1 have been placed in the map, the remaining boxes which do not have a 0 as the first digit are filled in with a 1 as the first digit.

After determining the value of the first digit in each box and filling it in on the map, the second digit of each number is determined by reference to Equation 2. This equation states that C is a 0 when $a$ and $b$ are both 1. They are both 1 in rows 6 and 7. Therefore, all boxes in the map in rows 6 and 7 are filled in with a 0 as the second digit. The second digits in the remaining boxes of the map are all 1.

In a manner similar to the above, the third digits in the boxes of the map readily may be calculated and placed in the map.

After the map is constructed, the stable circuit states are determined. A circuit state is stable when ACB, representing the next state, which appears as a binary number within the map, is equal to $acb$, representing the present state, which appears as a binary number in the leftmost column. The former numbers ACB representing stable states have a plus sign next to them.

It may be observed from the map that the circuit can assume only one of three stable states, that is, one of $ACB=011$, $ACB=110$ and $ACB=101$. The reset state of the circuit is 101. The map shows that this state occurs unconditionally when the inputs $S_A$, R and $S_B$ are made 000. The set A condition is 011. If the circuit is initially in the reset state and the inputs 011 are applied, the circuit will be switched to the set A state. This will be discussed in more detail shortly. The set B condition for the circuit is 110. If the circuit initially is in its reset state and the inputs 011 are applied, the circuit will be switched to the set B state, as discussed shortly.

That the map of Table I correctly describes the circuit operation readily may be verified by actually tracing the operation of the circuit of FIGURE 2. Assume, for example, that the inputs $S_ARS_B$ are 000. The input $S_A=0$ disables AND gate 11 and the input $R=0$ disables AND gate 10. These gates therefore produce 0 outputs and inverter 15 produces an output $A=1$. The inputs $R=0$ and $S_B=0$ disable AND gates 13 and 14, respectively, so that inverter 17 produces an output $B=1$. The two inputs to AND gate 12 are 11 so that is produces a 1 output and inverter 16 produces an output $C=0$. The circuit output therefore is 101—the circuit is in its reset state.

If, after the circuit is reset, the input 011 is applied, the circuit will be switched to the set B state (110). As $A=1$, when $S_B=1$ is applied, gate 13 is enabled and inverter 17 produces an output $B=0$. This output disables AND gates 10, 11 and 12 so that A remains 1. AND gate 12 is disabled so that C becomes 1 and AND gate 13 remains enabled so that B remains 0. Therefore $ACB=110$.

The operation above also can be traced from the map of FIGURE 1. The initial condition is $acb=101$ which occurs in row 7. The inputs are now changed to 011 which occurs in column 3. The number appearing in the map at the intersection of row 7 and column 3 is 100, representing an instantaneous "next state" condition for the circuit and this is an unstable condition. One must now go from $ACB=100$ (next state) to $acb=100$ (present state). This occurs in row 8. One now reads the value appearing in row 8, column 3. This value is 110. The number $acb=110$ appears in row 5. One now goes to row 5, column 3, and one observes that the same number is present, namely, $ACB=110=acb$. Thus, the next state is now equal to the present state and the circuit can be said to have assumed a stable condition. This stable condition is the set B condition which verifies the result obtained above by circuit analysis.

In a manner similar to the above, it can be shown that if the circuit is initially in its reset condition and the inputs 110 are applied, the circuit switches to its set A state, wherein $ACB=011$.

If the circuit, for example, is in its set B state, that is, 110 and an input 110 arrives, that is, the set A command arrives, the circuit state will not be changed. This is clear from the map. Thus, the circuit has the interesting property that if it has been set by the set B command 011 to the set B state 110, and during this period the set A command 110 arrives, the circuit will *not* be switched to the set A state 011. In a similar manner, if the circuit is initially in its set A state 011 and the set B command 011 arrives, the circuit willl remain in its set A state. The circuit, in other words, can be switched by a set A command to its set A condition or by a set B command to its set B condition only if the circuit initially is in its reset state.

The circuit of FIGURE 2 can be switched unconditionally to its set B state by the command 001 regardless of its present state. Similarly, the circuit can be switched unconditionally to its set A state by applying the command 100. In certain applications, this is a useful property. However, in the use of the circuit as a priority circuit, as described in the initial portion of this application, such operation is undesirable. Therefore, logic circuits may be included in the processor itself or in circuits associated with the present circuit to prevent the inputs 001 and 100 from being applied to the circuit.

Figure 3:
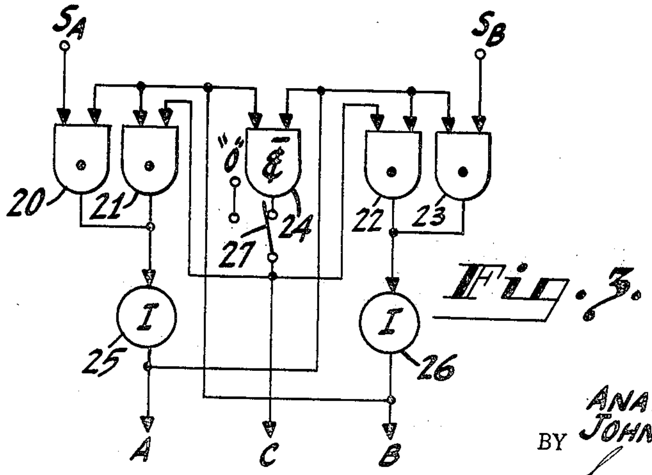
FIGURES 3, 4, 5 and 6 are block circuit diagrams of other embodiments of the invention, all of which include AND gates and inverters.

A second embodiment of the invention is shown in FIGURE 3. It includes four AND gates 20–23, respectively, a NAND gate 24 and two inverters 25 and 26, respectively. The Boolean equations which describe the circuit operation are:

$$A=\overline{(S_Ab+cb)} \qquad (4)$$

$$C=\overline{ab} \qquad (5)$$

$$B=\overline{(S_Ba+ac)} \qquad (6)$$

The map which describes the circuit operation is Table II below.

TABLE II

| ABC | $S_A S_B$ 00 | 01 | 11 | 10 | |
|---|---|---|---|---|---|
| 000 | 111 | 111 | 111 | 111 | |
| 001 | 111 | 111 | 011 | 011 | |
| 011 | 011+ | 011+ | 011+ | 011+ | Set A |
| 010 | 111 | 111 | 111 | 111 | |
| 110 | 110+ | 110+ | 110+ | 110+ | Set B |
| 111 | 000 | 000 | 000 | 000 | |
| 101 | 101+ | 100 | 000 | 001 | Reset |
| 100 | 111 | 110 | 110 | 111 | |

The map indicates a most interesting property for the circuit of FIGURE 3, namely when it is in the set A (011) state or the set B (110) state, it locks in that state. In other words, regardless of the value of $S_A$ or $S_B$, the outputs ACB cannot be affected. The circuit may be reset by making $S_A=S_B=0$ and applying a 0 directly to AND gates 21 and 22 via switch 27. This switch, while, shown as a mechanical switch, may in fact be an electronic switch. In response to this set of inputs 000, the circuit is reset to state 101. Referring to FIGURE 3, the 0 applied via switch 27 forces C to be 0. As $S_A$ and $S_B$ are also 0, AND gates 20, 21, 22 and 23 are all disabled. Thus, A and B switch to 1 and NAND gate 24 produces an output $C=0$.

Figure 4:
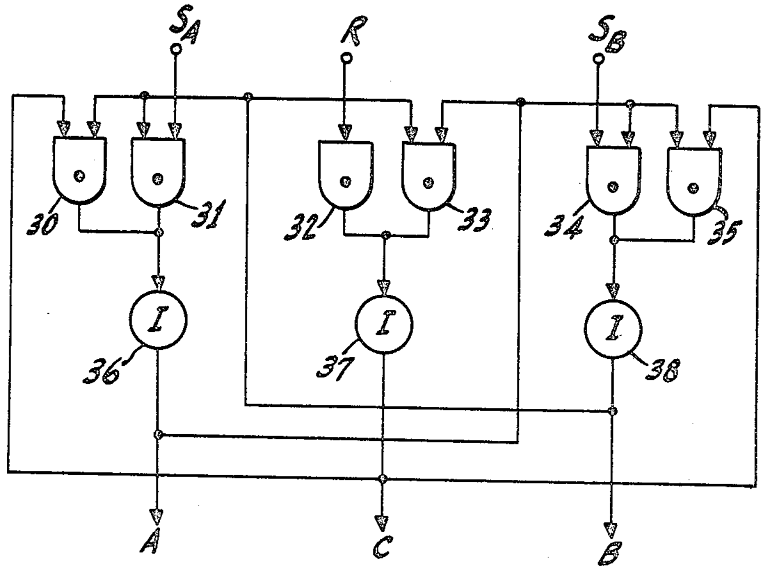

The circuit of FIGURE 4 includes six AND gates 30–35 and three inverters 36–38. AND gates 30 and 31 supply their output to inverter 36; AND gates 32 and 33 supply their output to inverter 37; and AND gates 34 and 35 supply their output to inverter 38. The output A of inverter 36 is applied to AND gates and 33 and 35; the output B of inverter 38 is applied to AND gates 30, 31 and 33; and the output C of inverter 37 is applied to AND gates 30 an d35. Gate 32, shown as a one input AND gate, operates as a Boolean "identity" logic circuit. In other words, when $R=1$, the output of the gate is a 1 and when $R=0$, the output of the gate is a 0.

The three Boolean equations which describe the operation of the circuit of FIGURE 4 are given below. Note that the equations for A and B are identical to the equations for A and B for the circuit of FIGURE 3. The equation for C includes one term of the equation for C of FIGURE 3. Accordingly, the three equations below are numbered 4*a*, 5*a* and 6*a*.

$$A=(\overline{cb+S_{A}b}) \qquad (4a)$$

$$C=(\overline{R+ab}) \qquad (5a)$$

$$B=(\overline{ac+S_{B}a}) \qquad (6a)$$

The map which describes the operation of the circuit of FIGURE 4 is Table IIA below.

TABLE IIA

| ACB | $S_A$ R $S_B$ | | | | | | | | |
|---|---|---|---|---|---|---|---|---|---|
| | 000 | 001 | 011 | 010 | 110 | 111 | 101 | 100 | |
| 000 | 111 | 111 | 101 | 101 | 101 | 101 | 111 | 111 | |
| 001 | 111 | 111 | 101 | 101 | 001+ | 001+ | 011 | 011 | Fourth state |
| 011 | 011+ | 011+ | 001 | 001 | 001 | 001 | 011+ | 011+ | Set A |
| 010 | 111 | 111 | 101 | 101 | 101 | 101 | 111 | 111 | |
| 110 | 110+ | 110+ | 100 | 100 | 100 | 100 | 110+ | 110+ | Set B |
| 111 | 000 | 000 | 000 | 000 | 000 | 000 | 000 | 000 | |
| 101 | 101+ | 100 | 100 | 101+ | 001 | 000 | 000 | 001 | Reset |
| 100 | 111 | 110 | 100+ | 101 | 101 | 100+ | 110 | 111 | Fifth state |

Figure 5:
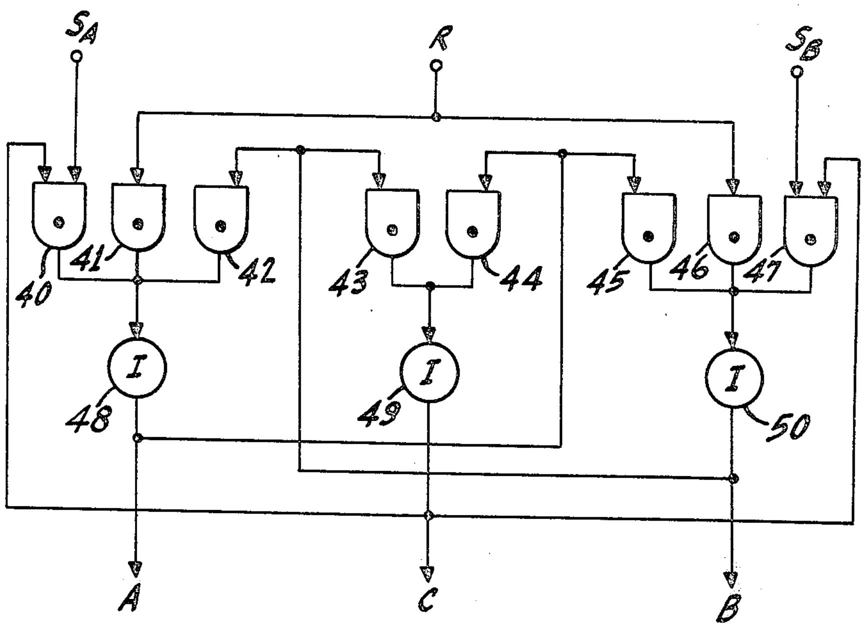

The map above indicates that the circuit of FIGURE 5 has the set A, set B and reset states identical to the corresponding states for the circuit of FIGURE 3. In addition, the circuit of FIGURE 4 includes a fourth state 001 and a fifth state 100.

The circuit of FIGURE 5 includes eight AND gates 40–47 and three inverters 48–50. The Boolean equations describing the operation of the circuit of FIGURE 5 are:

$$A=(\overline{S_{A}c+R+b}) \qquad (7)$$

$$C=(\overline{a+b}) \qquad (8,$$

$$B=(\overline{S_{B}c+R+a}) \qquad (9)$$

The operation of the circuit of FIGURE 5 is described in the map of Table III.

TABLE III

| ACB | $S_A$R$S_B$ | | | | | | | | |
|---|---|---|---|---|---|---|---|---|---|
| | 000 | 001 | 011 | 010 | 110 | 111 | 101 | 100 | |
| 000 | 111 | 111 | 010 | 010 | 010 | 010 | 111 | 111 | |
| 001 | 001+ | 001+ | 000 | 000 | 000 | 000 | 001+ | 001+ | Set A |
| 011 | 001 | 000 | 000 | 000 | 000 | 000 | 000 | C01 | |
| 010 | 111 | 110 | 110+ | 110+ | 110+ | 110+ | 110+ | 011 | Reset |
| 110 | 100 | 100 | 000 | 000 | 000 | 000 | 000 | 001 | |
| 111 | 000 | 000 | 000 | 000 | 000 | 000 | 000 | 001 | |
| 101 | 000 | 000 | 000 | 000 | 000 | 000 | 000 | 001 | |
| 100 | 100+ | 100+ | 000 | 000 | 000 | 000 | 100+ | 100+ | Set B |

It may be observed from the map that the circuit of FIGURE 5 has three stable states, namely, the reset state 010, the set A state 001 and the set B state 100.

If the circuit is in the reset state 010 and the input 001 (the set B command) is applied, the circuit switches to 110 then to 100 which is the set B state. This state is stable. If the circuit is in the set A state 001 and the set B command 001 is applied, the circuit remains in the set A state. The other properties of the circuit readily may be ascertained from Table III.

Figure 6:
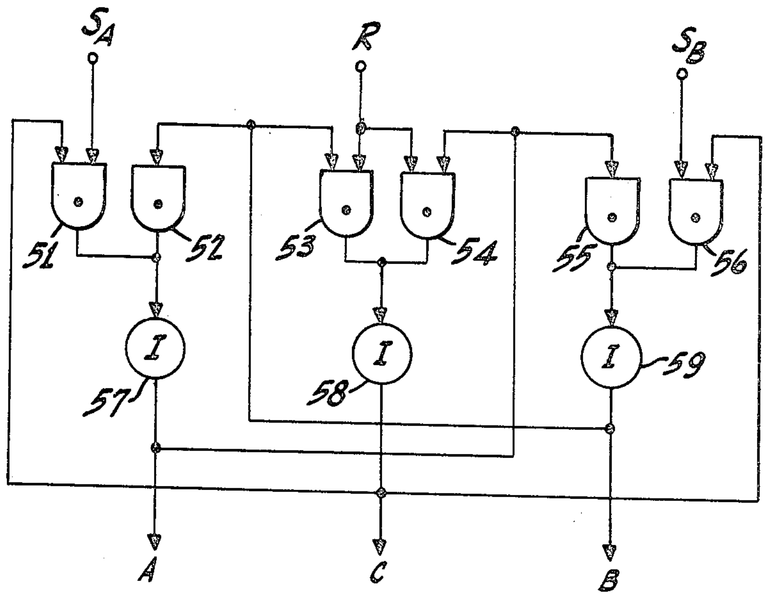

The circuit of FIGURE 6 includes six AND gates 51–56 and three inverters 57–59, respectively. The Boolean equations describing the circuit operation are:

$$A=(\overline{S_{A}c+b}) \qquad (10)$$

$$C=(\overline{Rb+Ra}) \qquad (11)$$

$$B=(\overline{S_{B}c+a}) \qquad (12)$$

The map which describes the circuit operation appears as Table IV below.

TABLE IV

| ACB | $S_A$ R $S_B$ | | | | | | | | |
|---|---|---|---|---|---|---|---|---|---|
| | 000 | 001 | 011 | 010 | 110 | 111 | 101 | 100 | |
| 000 | 111 | 111 | 111 | 111 | 111 | 111 | 111 | 111 | |
| 001 | 011 | 011 | 001+ | 001+ | 001+ | 001+ | 011 | 011 | Set A |
| 011 | 011+ | 010 | 111 | 001 | 001 | 000 | 010 | 011+ | Fourth state |
| 010 | 111 | 110 | 110 | 111 | 011 | 010+ | 010+ | 011 | Reset |
| 110 | 110+ | 110+ | 100 | 100 | 000 | 000 | 010 | 010 | Fifth state |
| 111 | 010 | 010 | 000 | 000 | 000 | 000 | 010 | 010 | |
| 101 | 010 | 010 | 000 | 000 | 000 | 000 | 010 | 010 | |
| 100 | 110 | 110 | 100+ | 100+ | 100+ | 100+ | 110 | 110 | Set B |

The map above indicates that the circuit of FIGURE 6, like the circuit of FIGURE 4, has five states, namely, the set A, set B and reset states and also fourth and fifth states.

Figure 7:
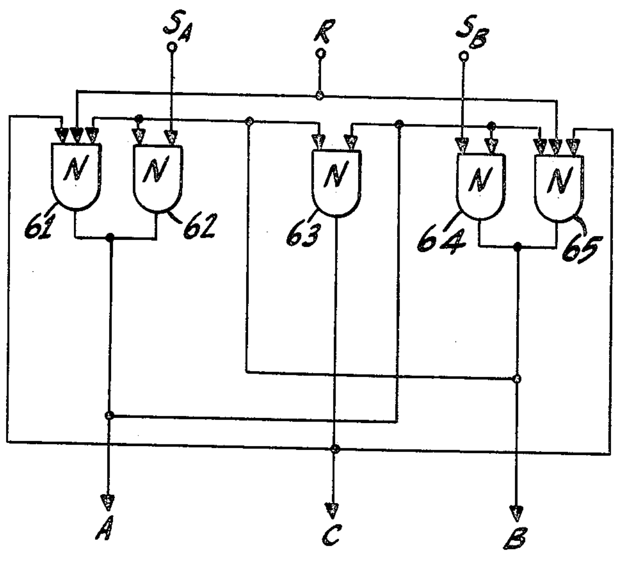
FIGURE 7 is a block circuit diagram of the embodiment of the invention which employs solely NOR gates.

The circuit of FIGURE 7 can be termed the dual of the circuit of FIGURE 2. The circuit of FIGURE 7 comprises five NOR gates 61–65, respectively. The logical sum of the outputs of NOR gates 61 and 62 is applied as one input to NOR gates 63, 64 and 65. The logical sum of the outputs of NOR gates 64 and 65 is applied as an input to NOR gates 61, 62 and 63. The output of NOR gate 63 is applied as one input to NOR gates 61 and 65. The input $S_A$ is applied to NOR gate 62; input R is applied to NOR gates 61 and 65; input $S_B$ is applied to NOR gate 64.

The Boolean equations which describe the operation of the circuit of FIGURE 7 are:

$$A=\overline{S}_{A}\overline{b}+\overline{bcR} \qquad (13)$$

$$C=\overline{a}\overline{b} \qquad (14)$$

$$B=\overline{S}_{b}\overline{a}+\overline{acR} \qquad (15)$$

The map for the circuit of FIGURE 7 appears as Table V below.

TABLE V

| ACB | $S_ARS_B$ | | | | | | | | |
|---|---|---|---|---|---|---|---|---|---|
| | 000 | 001 | 011 | 010 | 110 | 111 | 101 | 100 | |
| 000 | 111 | 111 | 110 | 111 | 011 | 010 | 111 | 111 | |
| 001 | 001+ | 001+ | 000 | 001+ | 001+ | 000 | 001+ | 001+ | Set A |
| 011 | 001 | 001 | 000 | 001 | 001 | 000 | 001 | 001 | |
| 010 | 111 | 110 | 110 | 111 | 011 | 010+ | 010+ | 011 | Reset |
| 110 | 100 | 100 | 100 | 100 | 000 | 000 | 000 | 000 | |
| 111 | 000 | 000 | 000 | 000 | 000 | 000 | 000 | 000 | |
| 101 | 000 | 000 | 000 | 000 | 000 | 000 | 000 | 000 | |
| 100 | 100+ | 100+ | 100+ | 100+ | 000 | 000 | 100+ | 100+ | Set B |

The circuit of FIGURE 7 has three stable states, namely, the reset state 010, the set A state 001 and the set B state 100. The circuit unconditionally may be reset by applying the inputs $S_ARS_B=111$. If the circuit is in a reset condition it may be placed in the set B state 100 by applying the set B command 001. On the other hand, if the circuit is initially in the set A state 001, and the set B command 001 is applied, the circuit will remain in the set A state 001. If the circuit is initially in its reset state 010 and the set A input command 100 is applied, the circuit will be switched to the set A state 001.

Duals of the remaining circuits are also possible, however, as the principle employed for constructing these circuits is clear from FIGURE 7, these other dual circuits are not discussed further herein.

Figure 8:
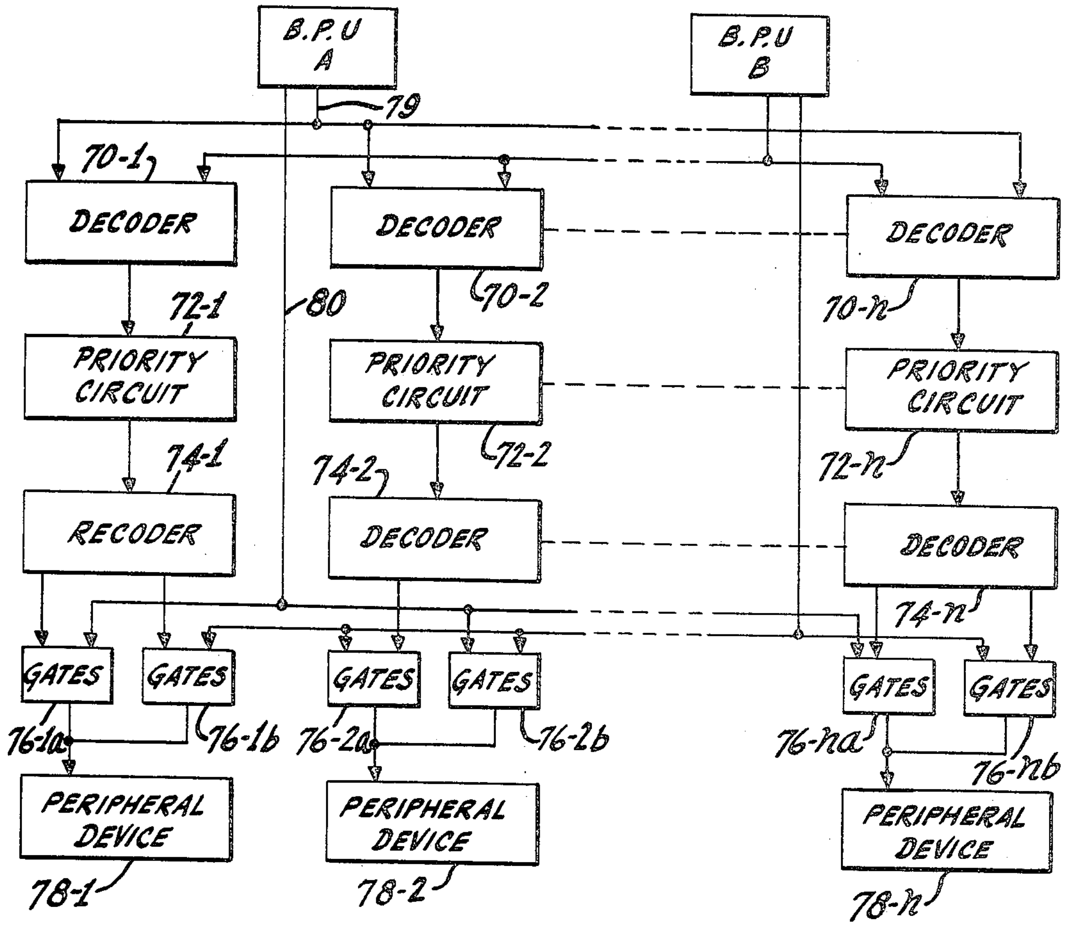
FIGURE 8 is a block circuit diagram of a system in which the priority circuit of the invention may be employed.

One system in which the circuits of the present invention are useful (there are others) is illustrated in part in FIGURE 8. The two basic processing units A and B are shown as B.P.U. A and B.P.U. B. It is assumed that there are *n* peripheral devices 78–1 through **78–*n***, where *n* is some integer. Accordingly, there are *n* priority circuits 72–1 through **72–*n***, each associated with a different peripheral device.

If a processor such as basic processing unit A desires access to a particular device such as 78–2, it applies a multiple bit command to its bus 79. This command is sensed by the decoder 70–2 and this decoder applies a set A command to priority circuit 72–2. The remaining decoders are not affected by the command for peripheral device 78–2.

It may be assumed, for purposes of the present explanation, that the priority circuits are all of the type shown in FIGURE 2. In this case, the set A command is 100 and in response to this command, the priority circuit 72–2, which is assumed initially to be in its reset state, produces an output 011. This output is decoded by decoder 74–2 and the latter applies an enabling signal to the input gates **76–2*a*. These gates now connect the bus 80 of basic processing unit A to the peripheral device 78–2. The gates 76–2*b* remain disabled so that basic processing unit B cannot interact with peripheral device 78–2**.

When basic processing unit A completes its interaction with peripheral device 78–2, it may apply a reset command to bus 79 to so indicate. This reset command is sensed by decoder 70–2 and the latter applies an output 000 to priority circuit 72–2. This places the priority circuit in its reset state 101 and it is in condition to receive the next command of the decoder, that is, the command "set A" or the command "set B."

What is claimed:

1. A multiple state logic circuit comprising, in combination:

first, second and third gate circuits for producing respective outputs A, C and B when in one condition and respective outputs $\overline{A}$, $\overline{C}$ and $\overline{B}$ when in another condition, at least the first and third of said gate circuits each including two multiple input gates;

a first feedback circuit from the first gate circuit to the second gate circuit and to the two multiple input gates of the third gate circuit for causing the second and third gate circuits to produce outputs C and B respectively when its output is $\overline{A}$;

a second feedback circuit from the second gate circuit to only one of the two multiple input gates of the first gate circuit and to only one of the two multiple input gates of the third gate circuit for tending to cause the first and third gate circuits to produce outputs $\overline{A}$ and $\overline{B}$, respectively when its output is C; and a third feedback circuit from the third gate circuit to the two multiple input gates of the first gate circuit and to the second gate circuit for causing the first and second gate circuits to produce outputs A and C respectively when its output is $\overline{B}$.

2. A multiple state logic circuit as set forth in claim 1, wherein each gate circuit includes means for producing the complement of at least one logical product.

3. A multiple state logic circuit as set forth in claim 1, wherein each gate circuit includes AND gate means followed by an inverter.

4. The circuit set forth in caim 1, wherein the first and third gate circuits each comprise two AND gates, means for obtaining the logical sum of the outputs of these AND gates, and an inverter for obtaining the complement of this logical sum.

5. A multiple state logic circuit as set forth in claim 4, wherein the second gate circuit comprises solely a single NAND gate.

6. A multiple state logic circuit as set forth in claim 1, wherein said first and third gate circuit each include as the two multiple input gates thereof two NOR gates and said second gate circuit comprises one NOR gate.

7. In the combination claimed in claim 6, further including:

means for applying a set signal to one NOR gate of said first gate circuit;

means for applying a second set signal to one NOR gate of said third gate circuit; and means for applying a reset signal to the other NOR gate of said first and third gate circuits.

8. The combination claimed in claim 1, further including:

means for applying a set signal to one multiple input gate of said first gate circuit;

means for applying a second set signal to one multiple input gate of said third gate circuit; and means for applying a reset signal to the other multiple input gates of said first and third gate circuits.

9. A multiple state logic circuit comprising, in combination:

first, second and third gate circuits, each including at least one multiple input gate which may be placed in a disabled or enabled condition, and the first and third gate circuits each including at least two multiple input gates;

a first feedback circuit from the first gate circuit to the second gate circuit and to all of said multiple input gates of said second gate circuit for disabling all multiple input gates in the second gate circuit when a multiple input gate in the first gate circuit is enabled;

a second feedback circuit from the third gate circuit to the second gate circuit and to all of said multiple input gates of the first gate circuit for disabling all multiple input gates in the first gate circuit when a multiple input gate in the third gate circuit is enabled; and a third feedback circuit from the second gate circuit to only one multiple input gate in the first and one multiple input gate in the third gate circuit for disabling said two multiple input gates when a gate in said second gate circuit is in a given one of its two conditions.

References Cited

UNITED STATES PATENTS

| | | | |
|---|---|---|---|
| 3,012,155 | 12/1961 | Jagger | 307—289 X |
| 3,178,590 | 4/1965 | Heilweil et al. | 307—238 X |
| 3,252,004 | 5/1966 | Scherr | 307—238 |
| 3,253,158 | 5/1966 | Horgan | 328—205 X |
| 3,275,848 | 9/1966 | Bell | 307—289 |
| 3,308,384 | 3/1967 | Wright | 228—92 X |

DONALD D. FORRER, Primary Examiner

U.S. Cl. X.R.

307—272, 291